United States Patent
Mariyani et al.

(10) Patent No.: US 12,470,907 B2
(45) Date of Patent: Nov. 11, 2025

(54) INITIAL ATTACH PRIORIZATION METHOD AND SYSTEM

(71) Applicant: T-Mobile Innovations LLC, Overland Park, KS (US)

(72) Inventors: Anil Kumar Mariyani, Ashburn, VA (US); Subramania Kaushik, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 319 days.

(21) Appl. No.: 18/347,992

(22) Filed: Jul. 6, 2023

(65) Prior Publication Data

US 2025/0016541 A1    Jan. 9, 2025

(51) Int. Cl.
*H04W 8/04* (2009.01)
*H04W 8/18* (2009.01)
*H04W 8/20* (2009.01)

(52) U.S. Cl.
CPC .......... *H04W 8/04* (2013.01); *H04W 8/18* (2013.01); *H04W 8/20* (2013.01)

(58) Field of Classification Search
CPC ........... H04W 8/04; H04W 8/20; H04W 8/18
See application file for complete search history.

(56) References Cited

U.S. PATENT DOCUMENTS

| | | | |
|---|---|---|---|
| 7,801,986 B2 | 9/2010 | Lybeck et al. | |
| 11,533,677 B1 * | 12/2022 | Tayal | H04W 48/16 |
| 2013/0322268 A1 * | 12/2013 | Shaw | H04L 41/5029 |
| | | | 370/252 |
| 2014/0064245 A1 * | 3/2014 | Abraham | H04W 72/56 |
| | | | 370/329 |
| 2016/0316397 A1 * | 10/2016 | Pantelidou | H04B 1/40 |
| 2018/0146503 A1 | 5/2018 | Castro Castro et al. | |
| 2025/0048303 A1 * | 2/2025 | Mariyani | H04W 60/04 |

* cited by examiner

*Primary Examiner* — Kamran Afshar
(74) *Attorney, Agent, or Firm* — Jones Robb, PLLC

(57) ABSTRACT

Systems, methods and devices are provided for subscriber prioritization upon initial attachment. Methods include receiving notification of an initial attach request from a wireless device at a subscriber locator function (SLF) and performing a database lookup at the SLF. Methods further include obtaining a subscriber priority from the database lookup and transmitting the subscriber priority from the SLF to a network component responding to the initial attach request from the wireless device.

20 Claims, 7 Drawing Sheets

INITIAL ATTACH PRIORIZATION METHOD AND SYSTEM

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, long term evolution (LTE), etc.), and 5G RATs (new radio (NR)). Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs.

In current 4G implementations, users may utilize wireless devices or UEs based on subscriptions. These subscriptions may allow for different priorities. For example, some users, who are wireless priority subscribers (WPS), may be prioritized over other users for wireless services. The prioritized users may, for example, include, first responders, emergency personnel, or law enforcement personnel. Once these users are connected to the network, they are guaranteed priority over other users. However, existing 4G implementations do not have an established method available for prioritizing users upon initial attachment.

Initial attachment occurs when users are new to a network, when users reboot, or when a network outage occurs and users must re-establish their connection with the network. Further, an initial attach procedure may be required when users move from a WiFi network to an LTE network, when users move from a 2G or 3G coverage area to the LTE network, or when users lose coverage due to being in an area without coverage and move to an LTE coverage area.

During network congestion or overload, many wireless device users are unable to perform an initial attach procedure. Further, because there is no prioritization for priority subscribers upon initial attach, the priority users have equal difficulties connecting to the network despite their priority status. Accordingly, a solution is needed for providing prioritization for priority subscribers during initial attach procedures.

OVERVIEW

Exemplary embodiments described herein include systems, methods, computer-readable media, and processing nodes for providing priority to priority subscribers during an initial attach procedure in a 4G network. An exemplary method includes receiving notification of an initial attach request from a wireless device at a subscriber locator function (SLF) and performing a database lookup at the SLF. The method additionally includes obtaining a subscriber priority from the database lookup and transmitting the subscriber priority from the SLF to a network component responding to the initial attach request from the wireless device.

An additional exemplary embodiment includes a system for prioritizing subscribers during an initial attach procedure. The system includes at least one memory storing instructions and a database. The database stores subscriber information including a subscriber priority. The system additionally includes a processor executing the instructions to perform multiple operations. The operations include receiving notification of the initial attach request from a wireless device at a subscriber locator function (SLF) and performing a database lookup at the SLF. The operations additionally include obtaining a subscriber priority from the database lookup and transmitting the subscriber priority from the SLF to a network component responding to the initial attach request from the wireless device.

An additional exemplary embodiment includes a processing node or a non-transitory computer-readable medium programmed to perform the methods described herein.

DETAILED DESCRIPTION

Exemplary embodiments described herein include systems, methods, and devices for prioritizing wireless device users during an initial attach procedure in a 4G environment. Embodiments provided herein modify existing network processes and components to support prioritization during initial attachment so that prioritized subscribers are more easily able to access the network during periods of network overloading and congestion.

The initial attach procedure is the initial procedure during which the wireless device registers to the network. The result of the initial attach procedure is the creation of the evolved packet system (EPS) bearer between the wireless device and the packet gateway (PGW), to enable sending and receiving of data between the wireless device and the network. Embodiments disclosed herein utilize the subscriber locator function (SLF) and modify existing initial attach procedures in order to provide priority to WPS customers during the initial attachment procedures. The SLF is a function within an IP multimedia subsystem (IMS) that provides information about a home subscriber server (HSS) that is associated with a particular user profile.

In embodiments disclosed herein, the SLF is provided with additional functionality to include a subscriber priority inquiry during subscriber look-up. In responding to a network component receiving an attachment request, the SLF shares the subscriber priority with the network component. The network component may, for example, be a mobility management entity (MME) of an LTE core network or call session control function (CSCF) of an IP Multimedia Subsystem (IMS), which is a standards-based architectural framework for delivering multimedia communications services such as voice, video and text messaging over IP networks.

Further, during the initial attach procedure performed by utilizing 4G/LTE network elements, the home subscriber server (HSS) can assign the required priority which helps the network to prioritize specific WPS or first responder subscribers during network congestion and severe overload conditions. This prioritization results in guaranteed service for priority subscribers during the initial attach procedure as the network leverages the priority values in response to an initial attach request during network congestion.

In embodiments set forth herein, a distributed system may be provided that operates within the evolved packet core (EPC) and the IMS. Alternatively, an initial attachment prioritization system may be a discrete system providing instructions to components of the EPC or IMS.

Through the use of systems, methods, and devices described herein, existing initial attachment processes are improved through additional functionality enabling recognition and preferred treatment of priority subscribers.

Figure 1:
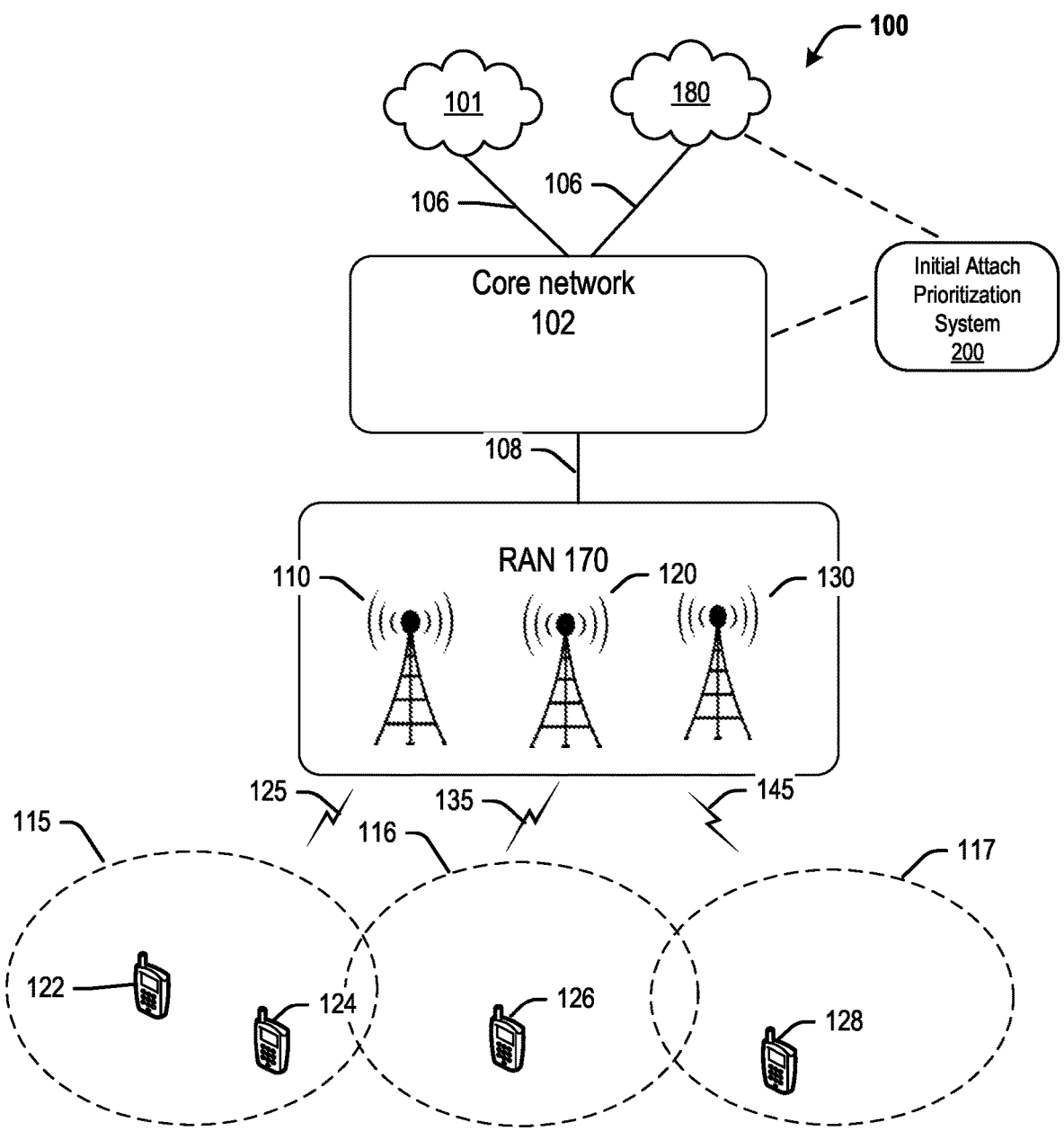
FIG. 1 depicts an exemplary operating environment system for prioritizing wireless devices during an initial attach procedure in accordance with the disclosed embodiments.

FIG. 1 depicts an exemplary system 100 for wireless communication, in accordance with the disclosed embodiments. The system 100 may include a communication network 101, IMS 180, core network 102, and a radio access network (RAN) 170 including access nodes 110, 120, and 130. The RAN 170 may include other devices and additional access nodes. Although three access nodes are shown, any number of access nodes may be included.

The system 100 also includes multiple wireless devices 122, 124, 126, and 128, which may be end-user wireless devices and may operate within one or more coverage areas 115, 116, and 117. The wireless devices 122, 124, 126, 128 communicate with access nodes 110, 120, and/or 130 within the RAN 170 over communication links 125, 135, and 145, which may for example be 4G LTE communication links.

The system 100 may further include an initial attach prioritization system 200, which is illustrated as operating between the core network 102 and the IMS system 180. However, it should be noted that the initial attach prioritization system 200 may be distributed. For example, the initial attach prioritization system 200 may utilize components located at both the core network 102 and the IMS 180. Alternatively, the initial attach prioritization system 200 may be an entirely discrete system operating within the core 102, within the IMS 180, or between the core network 102 and the IMS 180.

The initial attach prioritization system 200 operates based on requests for initial attachment from the wireless devices 122, 124, 126, and 128. The initial attach requests may reach the core network 102 or the IMS 180 depending on the services being requested. The components of the core network 102 or the IMS 180 transmit the request to the initial attach prioritization system 200 for subscriber and priority look-up. Based on the look-up, the initial attach prioritization system 200 transmits a response including a priority of the user to the core network 102 or the IMS 180.

The IMS 180 is a standards-based architectural framework for delivering multimedia communications services such as voice, video and text messaging over IP networks. The IMS 180 enables secure and reliable multimedia communications between diverse devices across diverse networks. The architectural model provides a unified infrastructure and common mechanisms for controlling, manipulating, routing, and managing sessions. A control layer of the IMS 180, often referred to as the IMS core, is responsible for regulating communications flows.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise Multimedia Broadcast Multicast Services (MBMS), code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network 102 may have an evolved packet core (EPC) structure. The network functions and elements may be separated into user plane functions and control plane functions. The user plane accesses a data network, such as network 101, and performs operations such as packet routing and forwarding, packet inspection, policy enforcement for the user plane, quality of service (QoS) handling, etc. The control plane handles radio-specific functionality that depends on the idle or connected states of the wireless devices 122, 124, 126, and 128

Communication links 106 and 108 can use various communication media, such as air, space, metal, optical fiber, or some other signal propagation path—including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links may use electromagnetic waves in the radio frequency (RF), microwave, infrared (IR), or other wavelength ranges, and may use a suitable communication protocol, including but not limited to Global System for Mobile telecommunications (GSM), Code Division Multiple Access (CDMA), Worldwide Interoperability for Microwave Access (WiMAX), Multimedia Broadcast Multicast Service (MBMS), Single-Carrier Radio Transmission Technology (1xRTT), Universal Mobile Telecommunications System (UMTS), High Speed Packet Access (HSPA), Evolution-Data Optimized (EV-DO), EV-DO rev. A, 3GPP LTE, WiMAX, 4G including LTE Advanced and the like, and 5G including 5G NR or 5G Advanced, 6G, NTN, or combinations thereof.

Communication links 106 and 108 can be direct links or might include various equipment, intermediate components, systems, and networks, such as a cell site router, etc. Communication links 106 and 108 may comprise many different signals sharing the same link.

The RAN 170 may include various access network systems and devices such as access nodes 110, 120, 130. The RAN 170 is disposed between the core network 102 and the end-user wireless devices 122, 124, 126, 128. Components of the RAN 170 may communicate directly with the core network 102 and/or the IMS 180 and others may communicate directly with the end user wireless devices 122, 124, 126, 128. The RAN 170 may provide services from the core network 102 to the end-user wireless devices 122, 124, 126, and 128.

The RAN 170 includes multiple access nodes (or base stations) 110, 120, 130, which may include one or more eNodeBs and additionally might include a next generation NodeB (gNodeB) 110 communicating with the plurality of end-user wireless devices 122, 124, 126, 128. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. The RAN 170 may further comprise a non-terrestrial network (NTN) serving the multiple UEs by a radio frequency transmission provided by utilizing orbiting satellites that may be in communication with access nodes of a terrestrial network TN. The satellites may include geosynchronous equatorial orbit (GEO) satellites, Medium Earth Orbit (MEO) satellites, and low Earth orbit (LEO) satellites. The NTN may include NTN nodes that are not stationed on the ground.

Access nodes 110, 120, 130 can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110, 120, 130 may comprise a short range, low power, small-cell access node such as a microcell access node, a picocell access node, a femtocell access node, or a home eNodeB device. Access nodes 110, 120, 130 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110, 120, 130 can comprise a processor and associated circuitry to execute or direct the execution of computer-readable instructions. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, a wearable device, an internet of things (IoT) device, as well as other types of devices or systems that can send and receive audio or data. The wireless devices 122, 124, 126 128 may be or include high power wireless devices or standard power wireless devices.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The initial attach prioritization may be implemented as computer-readable instructions or methods, and processing nodes on the network for executing the instructions or methods. The processing node may include a processor included in the access node or a processor included in any controller node in the wireless network that is coupled to the access node.

Figure 2:
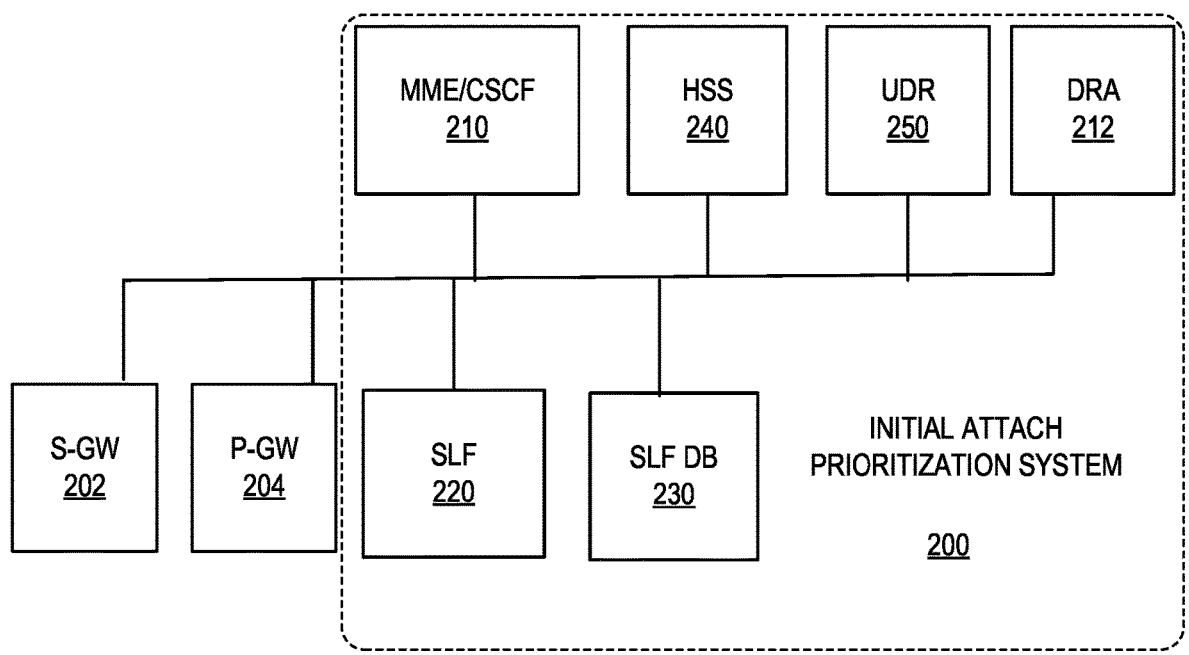
FIG. 2 illustrates an additional exemplary operating environment for an initial attach prioritization system in accordance with disclosed embodiments.

FIG. 2 depicts an exemplary environment for an initial attach prioritization system 200 in accordance with the disclosed embodiments. As explained above, the initial attach prioritization system 200 may be a discrete component or may be incorporated in a core network 102 or IMS 180 or distributed across the core network 102 and IMS 180. The environment shown in FIG. 2 illustrates operation of the initial attach prioritization system 200 with reference to both components of the core network 102 and the IMS 180. Components shown in FIG. 2 include a serving gateway (S-GW) 202, a packet gateway (P-GW) 204, a mobility management entity (MME) and/or call session control function (CSCF) 210, one or more home subscriber servers (HSS) 240, a unified data repository (UDR) 250, and a diameter routing agent (DRA) 212. The connected components further include a subscriber locator function (SLF) 220 and an SLF database (DB) 230.

When any wireless device 122, 124, 126, 128 sends an initial attach request, a session request is forwarded to the S-GW 202 and the P-GW 204. The S-GW 202 receives all uplink IP packets in uplink and downlink flow. The P-GW 204 provides interfaces toward the IMS 180 and network 101. The serving gateway S-GW 202 operates as an anchor point for wireless device user data while the wireless devices move between access nodes. Additionally, the S-GW 202 forwards user data between the access nodes and the P-GW.

Connected components include a mobility management entity (MME) 210 in the core network 102 and call session control function (CSCF) 210 in the IMS 180. Although the MME and CSCF 210 are different components, they are provided with the same reference numeral due to their similar function with respect to the initial attach prioritization system 200. While the MME 210 is a core component, the CSCF 210 is an IMS component. The MME 210 is responsible for authenticating the wireless devices 122, 124, 126, 128 and tracks their locations. Further, the MME 210 has the capability to select a suitable S-GW and P-GW for serving each ULE 122, 124, 126. Both the MME and CSCF 210 are responsible for controlling sessions initiated by the wireless devices 122, 124, 126, 128 and authenticating users to the HSS 240. While the MME 210 controls data sessions by setting up and terminating the data sessions, the CSCF 210 controls multimedia sessions or voice services within the IMS 180 and manages signaling from the end user to services and other networks. In order to reach the initial attach prioritization system 200 and the connected components described above, an initial attach request is transmitted from a wireless device 122, 124, 126, 128 and reaches either the MME 210 in the core network 102 or the CSCF 210 in the IMS 180, depending on the type of request.

The HSS 240 is shown as one component. However, multiple HSS 240 may be included in both the IMS 180 and the core network 102. The HSS 240 includes a database of subscriber and service data and contains subscription-related information (user profiles). The HSS 240 is used for registration and authentication in both the core network 102 and the IMS 180. The HSS 240 thus can be utilized to determine which services a user can access and users can be assigned to an HSS 240 based on their identities.

The UDR 250 may be incorporated in core network 102 and/or IMS 180 and may support storage and retrieval of policy data. The DRA 212 is a message switching engine of the IMS 180 that acts on a peer-to-peer network to perform proxy, translation, routing, and relay actions against messages. The DRA 212 provides real-time routing capabilities to ensure that messages are routed among the correct elements in a network. The DRA enables fluid diameter traffic between the components described herein and addresses increased diameter signaling traffic and growing complexity of 4G LTE networks.

The SLF 220 and the SLF DB 230 provide information about the home subscriber server (HSS) 240 that is associated with a particular user profile. When more than one HSS 240 is present, the CSCF 210 communicates with the SLF 220 to find the appropriate HSS 240 based on the user profile from the SLF DB 230.

In operation, components of the initial attach prioritization system 200 may interact with the illustrated components and may be incorporated in the illustrated components. This interaction will be further described with reference to FIG. 6. Without the initial attach prioritization system 200 described herein, priority subscribers would be detrimentally impacted during initial attach procedures. Accordingly, embodiments provided herein add the initial attach prioritization system 200 to interact with the illustrated components.

Figure 3:
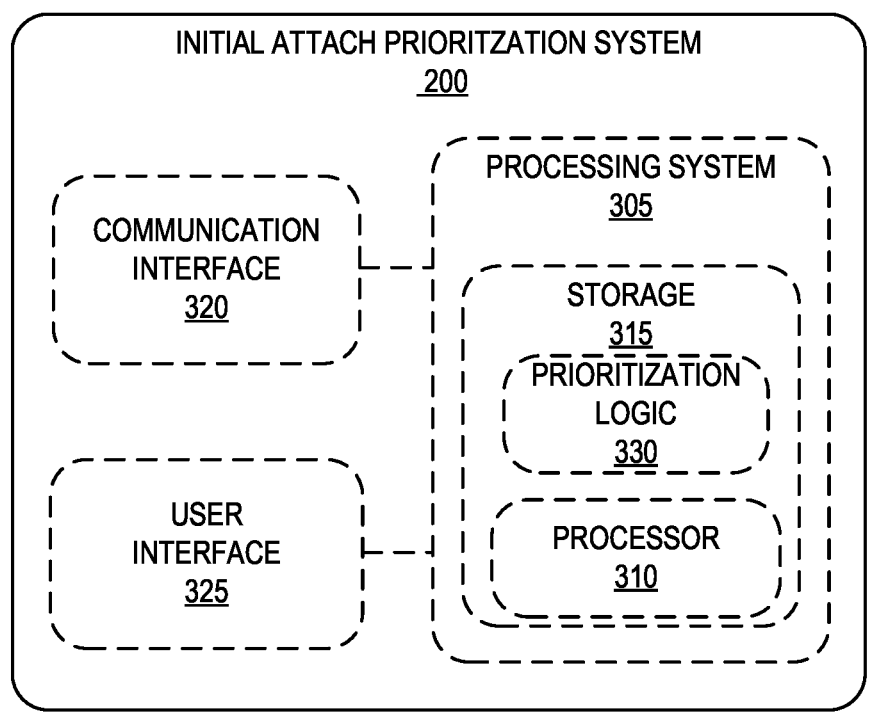
FIG. 3 illustrates an embodiment of an initial attach prioritization system in accordance with disclosed embodiments.

FIG. 3 depicts details of an initial attach prioritization 200 as a discrete component, which may be configured to perform the methods and operations disclosed herein to facilitate recognition of priority subscribers during initial attachment. In the disclosed embodiments, the initial attach prioritization system 200 may be located within the core network 102 or within the IMS 180 or may be integrated with various displayed components in FIG. 2. Alternatively or additionally, multiple initial attach prioritization systems 200 may be disposed to accommodate wireless devices in different coverage areas 115, 116, 117.

The initial attach prioritization system 200 ensures that users requesting an initial attach procedure are granted priority in accordance with their subscriptions. For example, first responders, emergency personnel, and law enforcement personnel will receive priority in connecting to the network during heavy network load or congestion. To perform these functions, the initial attach prioritization system 200 may include a processing system 305 including a storage area 315 and a processor 310. The storage device 315 may store prioritization logic 330. The prioritization logic 330 may include computer readable instructions to assist in distinguishing between priority subscribers and non-priority subscribers and to convey the determination in order to ensure wireless device users are properly prioritized during initial attach procedures.

Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. For example, instructions may be provided to look up wireless device user priorities, attach the priority to a response to an initial attach request, and transmit the response to ensure that priority is properly applied to each wireless user. Processor 310 may be a microprocessor and may include hardware circuitry and/or embedded codes configured to retrieve and execute software stored in storage device 315.

The initial attach prioritization system may include a communication interface 320 and a user interface 325. Communication interface 320 may be configured to enable the processing system 305 to communicate with other components, nodes, or devices in the wireless network. For example, the initial attach prioritization system 200 can provide instructions to the above-described components to ensure that priority is properly applied during initial attach procedures.

Communication interface 320 may include hardware components, such as network communication ports, devices, routers, wires, antenna, transceivers, etc. User interface 325 may be configured to allow a user to provide input to the initial attach prioritization system 200 from other components, such as for example, the DRA 212 and MME/CSCF 210 shown in FIG. 2. User interface 325 may include hardware components, such as touch screens, buttons, displays, speakers, etc. The initial attach prioritization system 200 may further include other components such as a power management unit, a control interface unit, etc.

The initial attach prioritization system 200 thus may utilize the memory 315 and the processor 310 to perform multiple operations. For example, the processor 310 may access stored instructions in the memory 310 to determine priorities and attach the determined priorities to responses in order to ensure proper prioritization of wireless users during an initial attach procedure.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 or the environment 200 may be, comprise, or include computers systems and/or processing nodes, including access nodes, controller nodes, and gateway nodes described herein.

Figure 4:
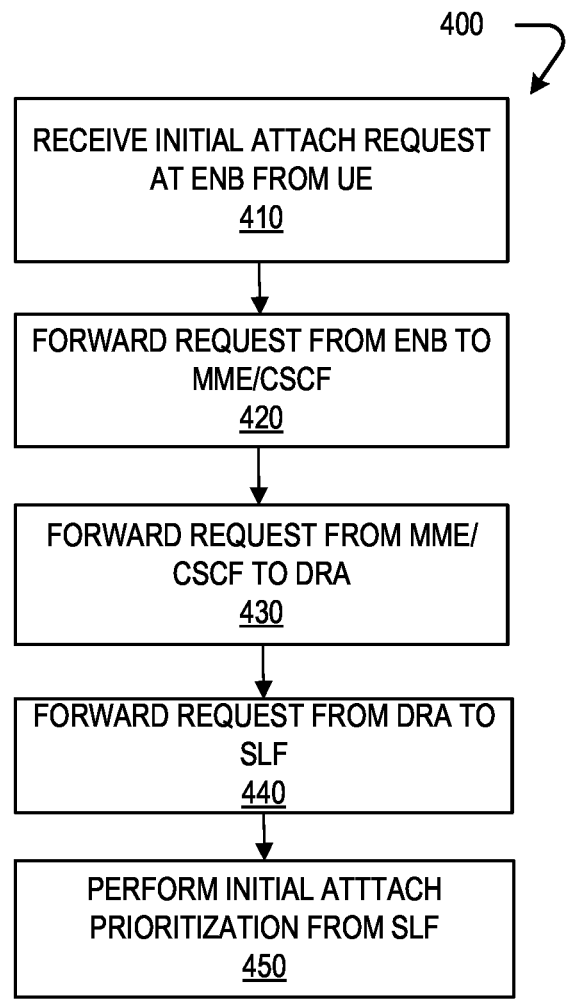
FIG. 4 is a flowchart depicting initial processing of an initial attach request in accordance with disclosed embodiments.

The disclosed methods for initial attach prioritization are discussed further below. FIG. 4 illustrates an exemplary method 400 for processing an initial attach request in accordance with embodiments set forth herein. Method 400 may be performed by any suitable combination of processors discussed herein, for example, a processor contained in an access node, a processor contained in a DRA2 212, MME/CSCF 210 and the processor 310 included in the initial attach prioritization system and/or other processors included in the components and functions shown in FIG. 2.

Method 400 begins in step 410, when an eNB, 110, 120, 130 receives an initial attached request from a wireless device 122, 124, 126, 128. The initial attach request may be embedded in a wireless device message. The message may also include a packet data network connectivity request message, a tracking area identifier (TAI) and an e-UTRAN cell global identifier (ECGI). Other information may also be included in the initial attach request.

In step 420, the eNB 110, 120, 130 forwards the request to the MME or CSCF 210 described above with respect to FIG. 2. In step 430, the initial attach request is forwarded from the MME or CSCF 210 to the DRA 212 through the use of an initial diameter authorization request.

In step 430, the DRA 212 forwards the diameter authorization request to the SLF 220. At the SLF 220, prioritization can be addressed by the performance of multiple steps 450, at the SLF 220, which interacts with the SLF DB 230 and the UDR 250. Through interaction with these components as instructed by the initial attach prioritization system 200, the SLF 220 determines a priority for the wireless device users.

Figure 5:
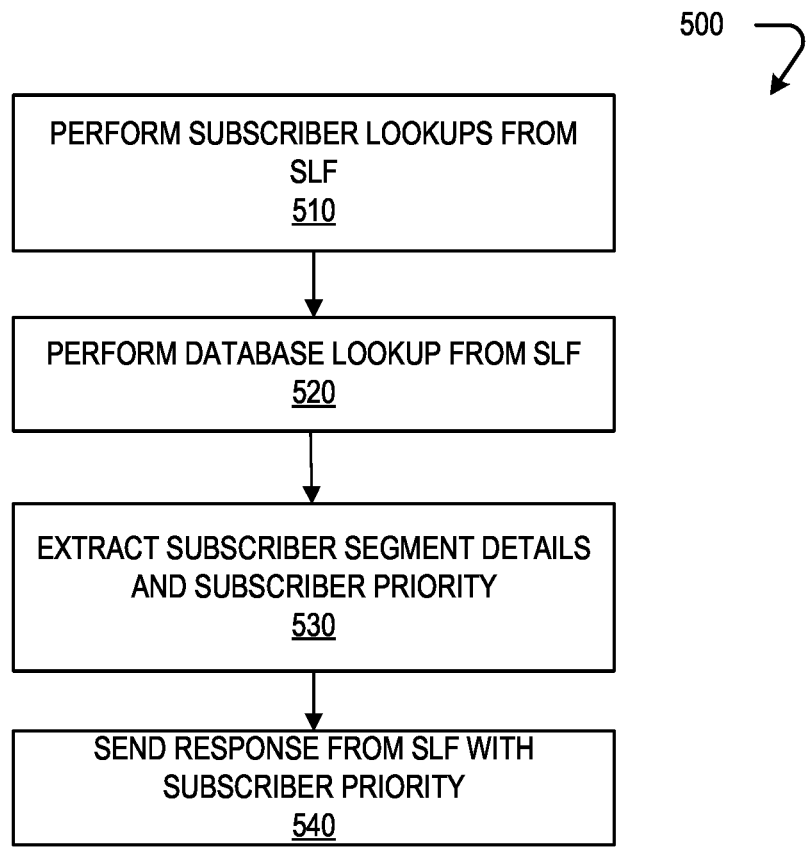
FIG. 5 is a flowchart depicting additional method steps for prioritization during initial attachment in accordance with the disclosed embodiments.

FIG. 5 illustrates further details of the method performed by the initial attach prioritization system 200 in accordance with provided embodiments. Method 500 may be performed by any suitable processor discussed herein, for example, a processor 310 included in the initial attach prioritization system 200 or a combination of the processor 310 with other processors, such as a processor of the SLF 220. For discussion purposes, as an example, method 500 is described as being performed by the processor 310.

In step 510, the initial attach prioritization system 200 causes the SLF 220 to maintain the SLF database 230 on an ongoing basis. In step 520, after the initial attach request is received and forwarded to the SLF 220, the initial attach prioritization system 200 causes the SLF 220 to do a database lookup in the UDR 250. In step 530, the SLF 220 receives subscriber segment details and a subscriber priority returned by the UDR 250 based on the contents of the initial attach request to the SLF 220. In step 540, the initial prioritization system 200 directs the SLF 220 to formulate and transmit a response toward the MME and CSCF 210 including the subscriber priority and subscriber segment. In embodiments set forth herein, the response is a diameter response transmitted to the DRA 212, which further transmits a response to the MME/CSF 210 including the subscriber priority and the subscriber segment.

Figure 6:
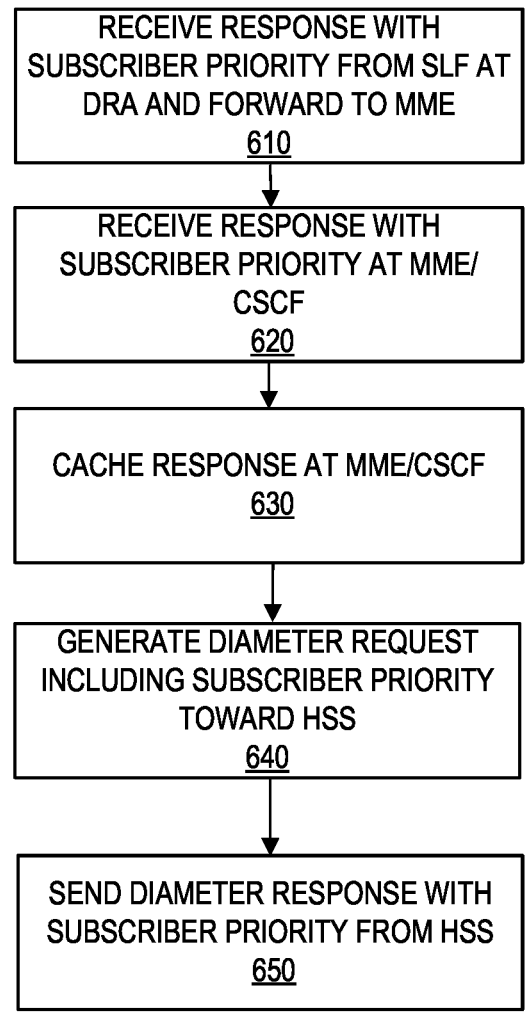
FIG. 6 is a flowchart illustrating completion of prioritization in accordance with disclosed embodiments.

FIG. 6 illustrates further details of the method performed by the initial attach prioritization system 200 and/or the network components described herein in accordance with provided embodiments. Method 600 may be performed by any suitable processor discussed herein, for example, a processor 310 included in the initial attach prioritization system 200 or a combination of the processor 310 with other processors.

In step 610, the response formulated with the subscriber priority at the SLF 210 is received at the DRA 212 and forwarded to the MME/CSCF 210 as a diameter response. In step 620, the diameter response is received at the MME/CSCF 210. Upon receipt in step 220, the MME/CSCF 210 caches the priority received for the subscriber in step 630. Thereafter, in step 640, any diameter request forwarded to the HSS 240 by the MME/CSCF 210 will include the subscriber priority. In embodiments set forth herein, the initial prioritization system 200 may cause the MME/CSCF 210 to generate the diameter authorization request including the priority and transmit the request to the HSS 240. Further, any response received from the HSS 240 in step 650 will include the subscriber priority. As a result of this response in step 650, the MME/CSCF 210 ensures that the wireless device receives appropriate priority during the initial attach procedure.

As illustrated in FIGS. 4, 5, and 6, methods may be implemented by the initial attach prioritization system 200 to ensure that priority subscribers are able to attach to the network during initial attach procedures. The method is particularly advantageous during periods of high network load and congestion.

Figure 7:
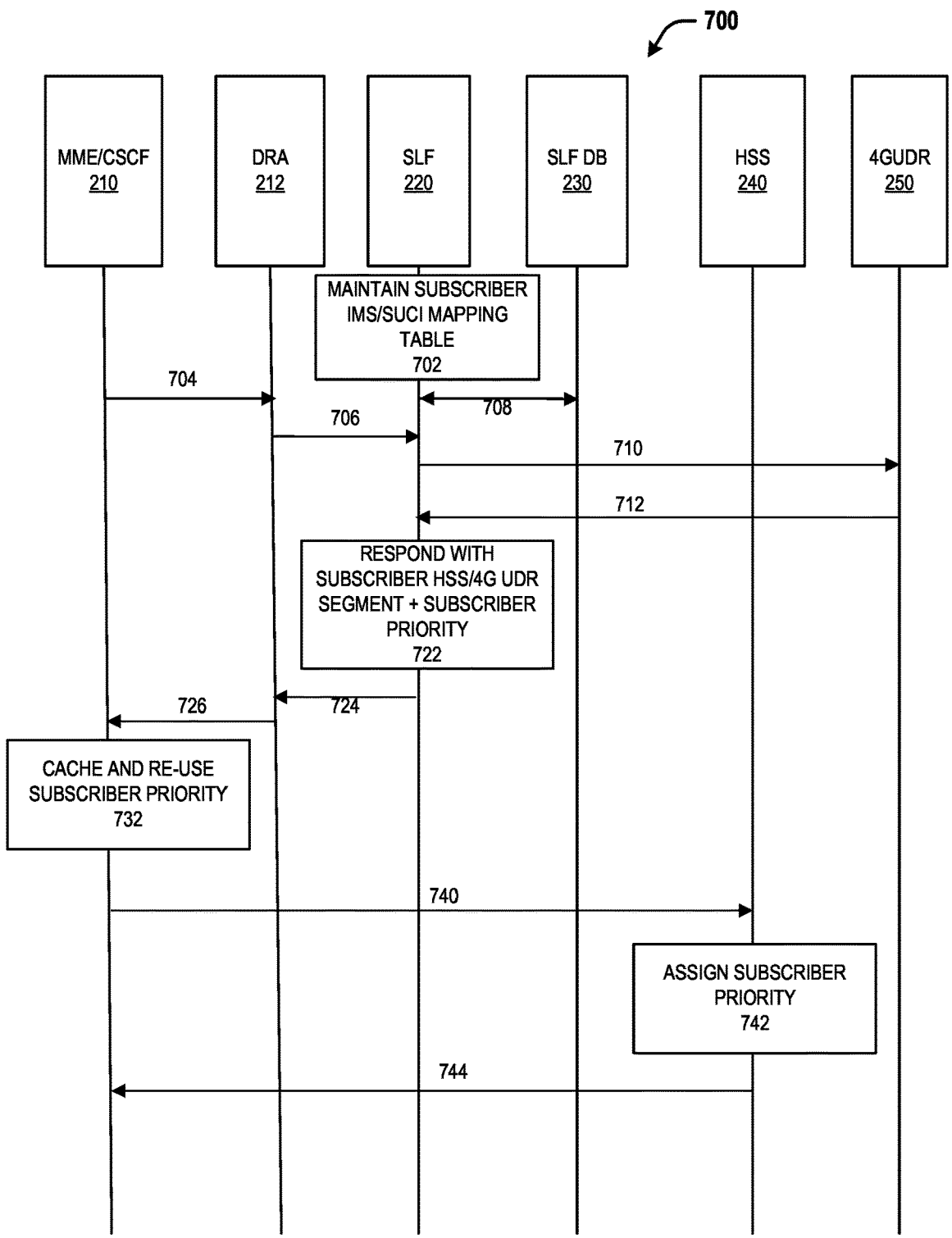
FIG. 7 is a flow diagram depicting an exemplary method for prioritization during initial attachment in accordance with disclosed embodiments.

FIG. 7 illustrates a method 700 for initial attach prioritization showing the interaction between the disclosed network components. During the method of FIG. 7, the SLF 220 continuously maintains the SLF database 230 by maintaining the SLF database 230 at step 702 in order to facilitate subscriber lookup in step 708.

Step 704 of the method of FIG. 7 is performed when the MME/CSCF 210 receives an attach request forwarded from the wireless device through the eNB and the serving gateway 202 and packet gateway 204 described above. Upon receiving the initial attach request, the MME/CSCF 210 sends an initial diameter authorization request to the DRA 212 in step 704. The DRA 212 receives the diameter authorization request and forwards it to the SLF 220 in step 706.

In step 710, the SLF 220 performs a database lookup at the UDR 250. The database lookup in step 710 locates subscriber segment details and a subscriber priority. In step 712, the UDR 250 returns both the subscriber segment details and subscriber priority to the SLF 220.

Upon receiving the subscriber segment and subscriber priority, the SLF 220, in step 722, formulates a diameter response including the segment and subscriber priority. In step 724, the SLF 220 forwards the formulated response to the DRA 212, which sends the response to the MME/CSCF in step 726.

Upon receiving the response including the segment and priority, the MME/CSCF 210 caches the subscriber priority for re-use in step 732. After caching the priority for reuse in step 732, any future diameter requests sent from the MME/CSCF 210 will include the subscriber priority. In step 740, the MME/CSCF 210 sends the diameter request with the subscriber priority to the HSS 240. The HSS 240 assigns the subscriber priority in step 744 and sends a diameter response including the subscriber priority in step 744. As a result of the diameter response generated at the HSS 240, requesting wireless devices will receive priority as assigned.

In some embodiments, methods 400, 500, 600, and 700 may include additional steps or operations. Furthermore, the methods may include steps shown in each of the other methods. As one of ordinary skill in the art would understand, the methods 400, 500, 600, and 700 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    receiving notification of an initial attach request from a wireless device at a subscriber locator function (SLF);
    performing a database lookup at the SLF;
    obtaining a subscriber priority from the database lookup; and
    transmitting the subscriber priority from the SLF to a network component responding to the initial attach request from the wireless device.

2. The method of claim 1, further comprising transmitting the notification of the initial attach request from a management mobility entity (MME) to the SLF.

3. The method of claim 2, wherein the network component is the MME.

4. The method of claim 1 further comprising transmitting the notification of the initial attach request from a call session control function (CSCF) to the SLF.

5. The method of claim 4, further comprising, wherein the network component is the CSCF.

6. The method of claim 1, further comprising transmitting the subscriber priority from the network component to a home subscriber server (HSS).

7. The method of claim 6, further comprising assigning the subscriber priority to the wireless device at the HSS.

8. The method of claim 7, further comprising transmitting, from the HSS, the subscriber priority in a response to the network component.

9. The method of claim 1, further comprising caching the subscriber priority at the network component.

10. A system for prioritizing subscribers during an initial attach procedure, the system comprising:
    at least one memory storing instructions and a database, the database storing subscriber information including a subscriber priority; and
    a processor executing the instructions to perform operations including:
        receiving notification of the initial attach request from a wireless device at a subscriber locator function (SLF);
        performing a database lookup at the SLF;
        obtaining a subscriber priority from the database lookup; and
        transmitting the subscriber priority from the SLF to a network component responding to the initial attach request from the wireless device.

11. The system of claim 10, wherein the network component is a call session control function (CSCF).

12. The system of claim 10, wherein the network component is a management and mobility entity (MME).

13. The system of claim 10, the network component utilizing a processor causing transmission of the subscriber priority from the network component to a home subscriber server (HSS).

14. The system of claim 13, the HSS utilizing a processor to assign the subscriber priority to the wireless device.

15. The system of claim 14, the processor utilized by the HSS further causing transmission, from the HSS, of the subscriber priority in a response to the network component.

16. The system of claim 10, further comprising a cache storing the subscriber priority at the network component.

17. A non-transitory computer readable medium storing instructions executed by a processor to perform operations comprising:
    receiving notification of an initial attach request from a wireless device at a subscriber locator function (SLF);
    performing a database lookup at the SLF;
    obtaining a subscriber priority from the database lookup; and
    transmitting the subscriber priority from the SLF to a network component responding to the initial attach request from the wireless device.

18. The non-transitory computer readable medium of claim 17, the operations further comprising transmitting the subscriber priority from the network component to a home subscriber server (HSS).

19. The non-transitory computer readable medium of claim 18, the operations further comprising assigning the subscriber priority to the wireless device at the HSS.

20. The non-transitory computer readable medium of claim 17, the operations further comprising caching the subscriber priority at the network component.

\* \* \* \* \*